(12) United States Patent
Barry et al.

(10) Patent No.: US 7,628,324 B2
(45) Date of Patent: Dec. 8, 2009

(54) SYSTEM AND METHOD FOR A SMART PASSENGER TRAVEL KIOSK

(75) Inventors: James Barry, Madison, CT (US); Ron Dunsky, Brooklyn, NY (US); Matthew Marcella, West Hempstead, NY (US); Louis Petrucelly, Bethpage, NY (US)

(73) Assignee: PASSUR Aerospace, Inc., Greenwich, CT (US)

( * ) Notice: Subject to any disclaimer, the term of this patent is extended or adjusted under 35 U.S.C. 154(b) by 0 days.

(21) Appl. No.: 11/078,005

(22) Filed: Mar. 11, 2005

(65) Prior Publication Data
US 2006/0000903 A1    Jan. 5, 2006

Related U.S. Application Data

(60) Provisional application No. 60/552,113, filed on Mar. 11, 2004.

(51) Int. Cl.
*G06F 19/00* (2006.01)
(52) U.S. Cl. .................. 235/385; 705/14; 705/5; 705/6; 705/26; 705/27; 235/381

(58) Field of Classification Search ............... 235/385
See application file for complete search history.

(56) References Cited

U.S. PATENT DOCUMENTS

| | | | |
|---|---|---|---|
| 2001/0032121 A1* | 10/2001 | Le | 705/14 |
| 2002/0044639 A1* | 4/2002 | Shioda et al. | 379/207.02 |
| 2002/0082848 A1* | 6/2002 | Hansen et al. | 705/1 |
| 2002/0099500 A1* | 7/2002 | Schmier et al. | 701/200 |
| 2003/0208396 A1* | 11/2003 | Miller et al. | 705/14 |
| 2004/0193313 A1* | 9/2004 | Cornet et al. | 700/231 |
| 2004/0225560 A1* | 11/2004 | Lewis et al. | 705/14 |
| 2004/0243302 A1* | 12/2004 | Barry et al. | 701/204 |
| 2005/0137916 A1* | 6/2005 | McElhannon | 705/5 |

* cited by examiner

*Primary Examiner*—Daniel Walsh
*Assistant Examiner*—Tae W Kim
(74) *Attorney, Agent, or Firm*—Fay Kaplun & Marcin, LLP (57) ABSTRACT

A passenger kiosk, comprising a computing arrangement receiving data from a plurality of data feed arrangements, the data including airport operational parameters for an airport facility, a set of advertisements and inventory management rules and a kiosk display displaying one of the advertisements based on one of the airport operational parameters and one of the inventory management rules.

19 Claims, 9 Drawing Sheets

Fig. 1

Access Kiosk 100

SYSTEM AND METHOD FOR A SMART PASSENGER TRAVEL KIOSK

PRIORITY CLAIM

This application claims the benefit of U.S. Provisional Patent Application No. 60/552,113 filed on Mar. 11, 2004 and entitled "System and Method for a Smart Passenger Travel Kiosk," the specification of which is expressly incorporated herein, in its entirety, by reference.

BACKGROUND INFORMATION

Travel data which is relevant to a traveler is compartmentalized. Travelers and meeters/greeters lack valuable travel information because it is difficult for airlines, airports, air traffic control ("ATC"), travel web sites and others to assemble access, and deliver timely relevant information. As a result, airports, airlines, airport retailers, and advertisers are not maximizing the buying power of an interested, and in most cases, captive audience.

SUMMARY OF THE INVENTION

A passenger kiosk, comprising a computing arrangement receiving data from a plurality of data feed arrangements, the data including airport operational parameters for an airport facility, a set of advertisements and inventory management rules and a kiosk display displaying one of the advertisements based on one of the airport operational parameters and one of the inventory management rules.

Furthermore, a method of receiving data from a plurality of data feed arrangements, the data including airport operational parameters for an airport facility, a set of advertisements and inventory management rules and displaying one of the advertisements based on one of the airport operational parameters and one of the inventory management rules.

In addition, a method of receiving a first set of data from a first data feed arrangement, the first set of data including status information for a facility and receiving a second set of data from a second data feed arrangement, the second set of data including offers corresponding to an operating parameter of the facility. Then, processing the first set of data to determine a current operating parameter and comparing the current operating parameter to the operating parameter included in the second set of data. Finally, displaying the offers to a user when the current operating parameter matches the operating parameter included in the second set of data.

BRIEF DESCRIPTION OF DRAWINGS

FIG. 7 shows a second exemplary advertising display screen which may be displayed by the kiosk according to the present invention;

DETAILED DESCRIPTION

The present invention may be further understood with reference to the following description and the appended drawings, wherein like elements are provided with the same reference numerals. The exemplary embodiment of the present invention present eases and enhances the travel experience for passengers and their meeters/greeters by improving the predictability of the travel experience, thereby increasing the potential airline travel. The exemplary embodiment also leads to an increase of airport concession sales which is a major source of revenue for airports. Throughout this description, the term passenger will be used generally to describe any user of the exemplary embodiments of the present invention described herein.

Figure 1:
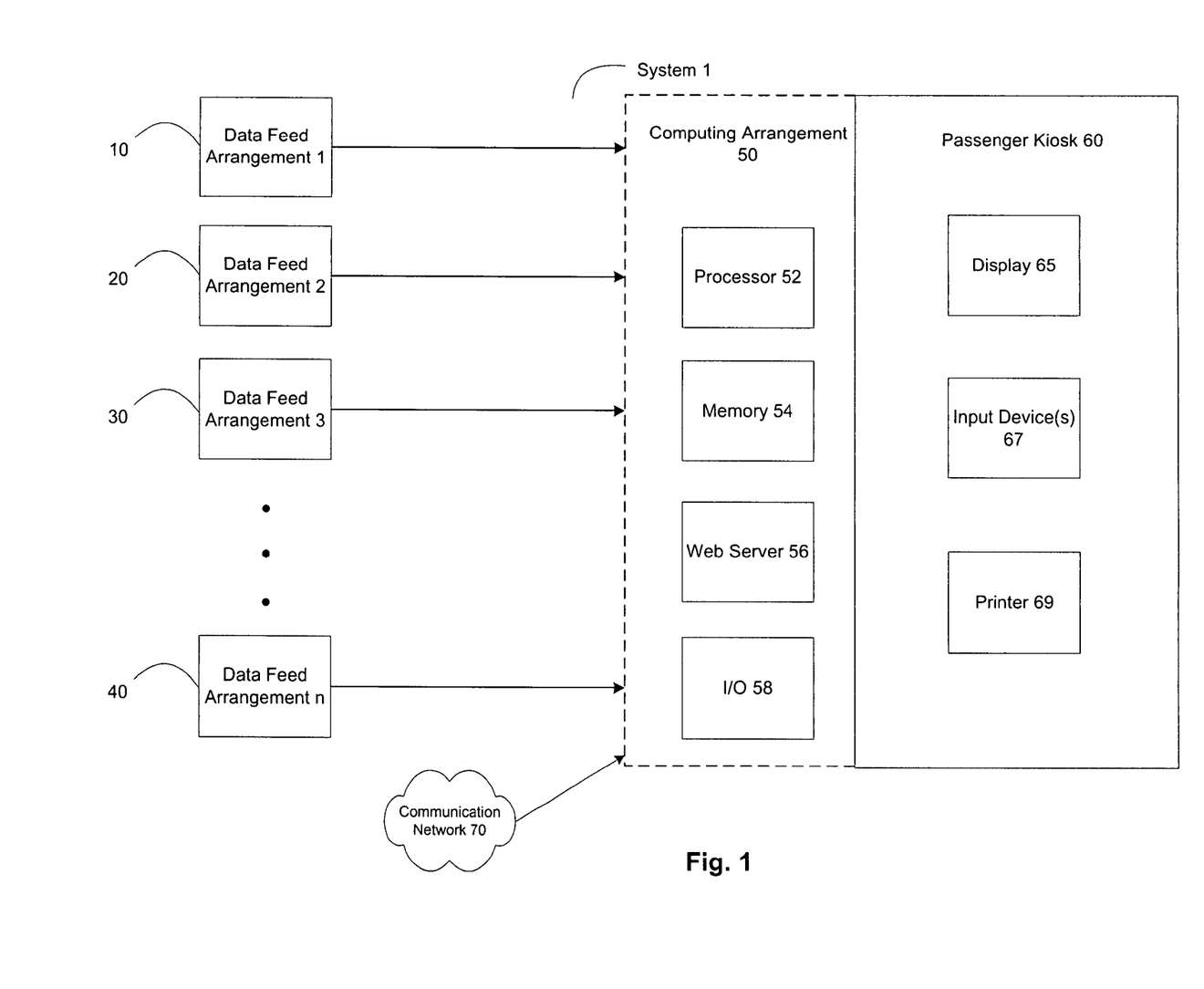
FIG. 1 shows an exemplary system for implementing a smart passenger travel kiosk according to the present invention.

FIG. 1 shows an exemplary system 1 for implementing a smart passenger travel kiosk 60. The system 1 includes a plurality of data feed arrangements 10-40, a computing arrangement 50 and a passenger kiosk 60. The data feed arrangements 10-40 may be any of a number of data feed arrangements which communicate information concerning the operation of a travel facility (e.g., an airport). In the example of an airport, the data feed arrangement 1 (10) may be a data feed from the FAA, the data feed arrangement 2 (20) may be a data feed from the airport's active radar facility, data feed arrangement 3 (30) may be a data feed from the airport's passive radar facility and data feed arrangement n (40) may be a data feed from an advertising system associated with the airport facility. The data from the data feed arrangements 10-40 may be raw data or data that has already been pre-processed by sub-systems of the particular system from which the data is derived, e.g., the data from the passive radar system that is directed from the data feed arrangement 3 (30) may have been previously pre-processed by various passive radar subsystems that are used for other purposes within the airport facility.

Examples of a data feed arrangements 10-40 may include, for example, the PASSUR™ System by Megadata Corporation of Greenwich, Conn., the ASD data feed provided for resale from the FAA, any active or passive radar systems in use by the airport facility, etc. The PASSUR™ System is a passive radar, which, without emitting any active signals, receives aircraft identification and altitude information from aircraft transponder transmissions, which are interrogated by existing secondary surveillance radars. More information on the PASSUR™ System is provided by Megadata Corporation at www.passur.com. The data feed arrangement may be one or more outside data sources. Other examples of data feed arrangements 10-40 may include live schedule information and delay and cancellation information which are provided by the airlines or by third party vendors (e.g., OAG), terminal or other location weather information (e.g., from NEXRAD), security related information from the Transportation Security Agency ("TSA"), state/private roadway information, airport operational databases ("AODBs"), etc.

As an aircraft is in flight, the systems which back up some of the data feed arrangements 10-40 may be collecting various information from the aircraft (or its radar signature). For example, the PASSUR™ System described above may provide data on the aircraft which includes a track identification, the time (e.g., UNIX time), the x-position, the y-position, altitude, x-velocity component, y-velocity component, z-velocity component, the speed, the flight number, the airline, the aircraft type, and provides this information every 4.6 seconds for the aircraft.

Other data feed arrangements 10-40 may include information such as flight tracks, terminal weather conditions, ETA's, text or instant messaging from airline/airport, concession status, roadway status, on-time rankings, security information (e.g., terminal closures, wait time at checkpoints, etc.), gate assignments, airplane type, departure/arrival time updates, diversion information, flight plan changes, etc. Another example of the type of information that may be input by or derived from the data from data feed arrangements 10-40 may be such information as is displayed by the OPSNet™ product also provided by Megadata Corporation of Greenwich, Conn. Information on the OPSNet™ product is also provided at www.passur.com. Those of skill in the art will understand that the above identified information is only exemplary and there are any number of data feeds which provide a variety of data and information as to the status of an airport facility and its associated aircraft.

Throughout this description, any information which is input from the data feed arrangements 10-40 or from the communications network 70 into computing arrangement 50 may be referred to as airport operational parameters. This term includes information which is derived from such input information. Thus, while there may be information such as weather data, roadway data, etc., which may not be considered as traditional airport parameters, since this information is being input into computing arrangement 50, for the purposes of this description it will be considered as airport operational parameters. Any information which is input by a passenger into the kiosk 60 (e.g., requested flight information, credit card swipe information, etc.) may be referred to as passenger parameters.

The computing arrangement 50 may include various components such as a processor 52, a memory 54, a web server 56 and I/O devices 58. Those of skill in the art will understand that exemplary computing arrangement 50 may include any number of other components that may be used to accomplish the functions described herein for the present invention. The computing arrangement 50 receives the data from the data feed arrangements 10-40, processes the data and prepares it for presentation to a user of the passenger kiosk 60. The computing arrangement 50 may also include a link to a communications network 70 (e.g., the Internet) to either receive additional data from the communication network 70 or for the passenger who accesses the data at the passenger kiosk to access additional data that may be available via the communication network 70, e.g., a particular airline's web page.

The passenger kiosk 60 may include a display to display the information to the passenger, input device(s) 67 for the passenger to interact with the kiosk 60 and a printer 69 to print offers and/or information for the passenger. The computing arrangement is shown in dashed lines because the computing arrangement may be physically located in the area of the kiosk 60 or it may be located remotely. Thus, the system 1 may include a central computing arrangement 50 which servers multiple passenger kiosks 60 or individual computing arrangements 50 for each kiosk 60. Thus, an airline terminal may have multiple kiosks 60 for passengers to access information.

The computing arrangement 50 receives the various data from the data feed arrangements 10-40 and organizes the data from each of these sources to provide a comprehensive travel picture to the passengers. The exemplary system 1 of the present invention eliminates the compartmentalization of data based on individual sources within the airport. Each of the available sources (e.g., data feed arrangements 10-40 and/or third party data sources communicating via the communication network 70) is aggregated by the computing arrangement 50 to give a passenger the complete status of the airport and the individual parameters which effect the passenger (e.g., specific flight information).

Figure 2:
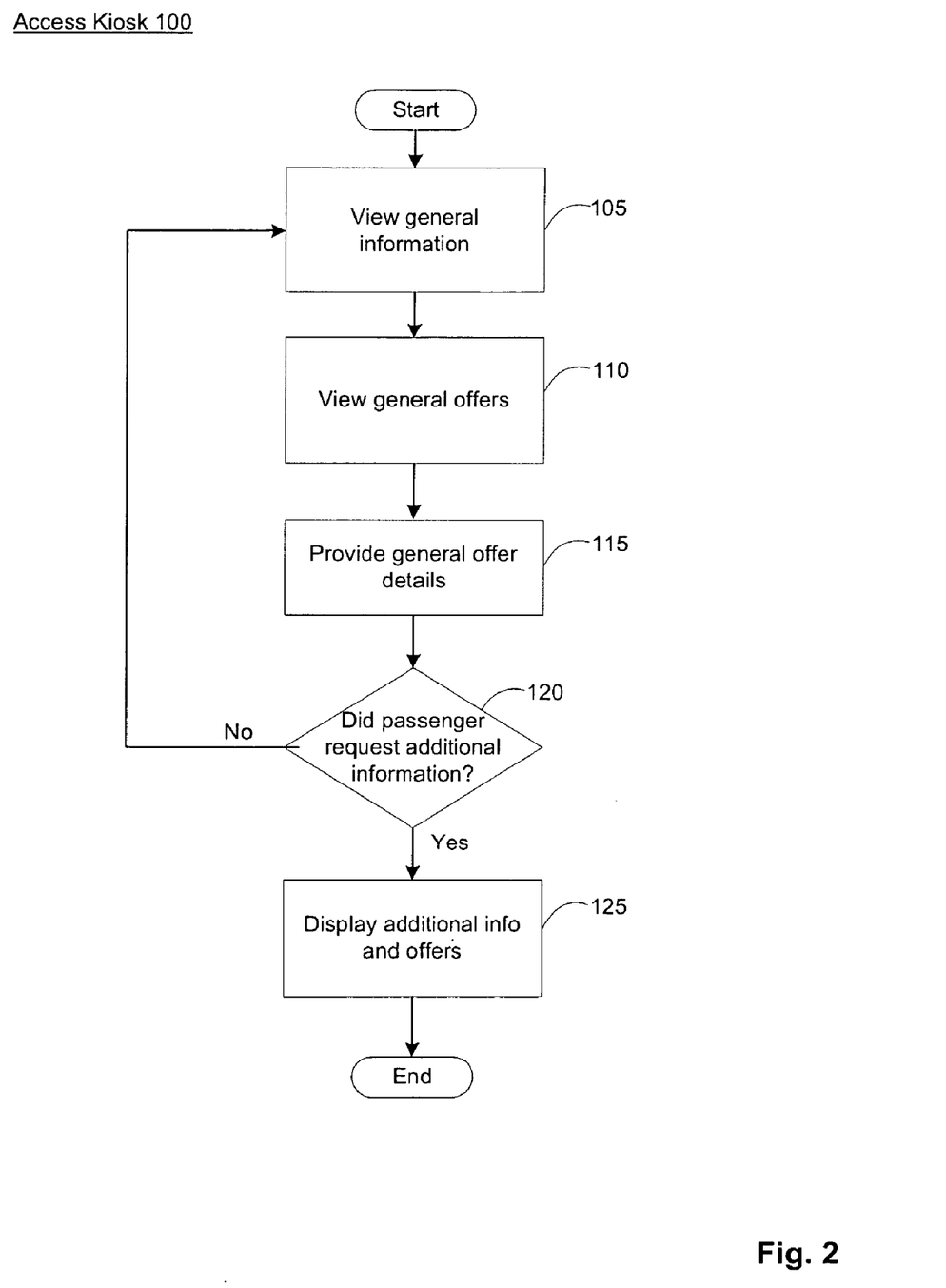
FIG. 2 shows an exemplary process for a user to access a smart passenger travel kiosk according to the present invention.

FIG. 2 shows an exemplary process 100 for a user to access a smart passenger travel kiosk 60. In step 105 a passenger approaches the kiosk 60 and views general information concerning the status of the departing airport and/or arriving aircraft. This information may be presented using a unique screen format on the display 65 to capture the attention of the passenger. The information presented on the general screen is based on data which is input from the data feed arrangements 10-40. For example, the general screen may present a list of arrivals which is generated from data feed arrangement 1 (10) data and a general banner ad which is generated from data feed arrangement n (40). The advertising on the general screen may be generic to the departing airport.

Other information presented on the general screen may include airport operational parameters and offers based on the general airport performance. For example, using the data from the data feed arrangements 10-30, the computing arrangement 50 may determine that the airport is experiencing an average delay of >20 minutes, but less than 40 minute delay. The data feed arrangement n (40) may have information that includes offers which relate to specific airport operating parameters. For example, the delay described above, may fit into the parameters for offering passengers a 10% discount on coffee or other beverages at participating retailers within the terminal.

The general screen may include a notice of the offer which the passenger may view (step 110). The passenger may then interact with the kiosk 60 via the input device(s) 67 to receive the general offer (step 115). The passenger may receive the general offer in the form of a printed coupon usable at the participating retailers or the passenger may simply receive information such as the nature of the offer and the locations of participating retailers. In such a case, the computing arrangement 50 may communicate with the participating retailers so that they are aware of the current offer to passengers.

In step 120, the kiosk 60 determines if the passenger requested additional information. The additional information may include, for example, a request for specific flight information. If not, the kiosk returns the display 65 to the general screen in step 105. If the passenger requested additional information, the process 100 continues to step 125 to display additional information to the passenger. For example, the passenger may have requested information on a specific flight by entering a flight number via the input device(s) 67. The computing arrangement 50 may receive the request from the passenger and retrieve information from the data feed arrangements 10-40 concerning the particular flight to display to the passenger. For example, the computing arrangement may retrieve the estimated time of arrival ("ETA") of the flight, the flight track of the flight, the gate number for an arriving flight, the runway the flight is landing on, etc. Other information displayed in response to a passenger's request may include on-time rankings for the departure and destination airports, airport delay information, etc. It should be noted that the information that is displayed may be based on real-time data received by the computing arrangement 50, archived data and/or a combination of the above.

The screens which are displayed in response to a customer request may also include advertising. The advertising displayed on these screens may be based on the specific characteristics and/or information requested by the passenger and the results of the information search, e.g., the airport operational parameters and the passenger parameters. For example, the passenger may request the status of a specific arriving flight. The display screen may indicate to the passenger that the flight is delayed by 1 hour. The computing arrangement 50 may compare the data requested by the passenger (the passenger parameters) to inventory management rules (described more fully below) for pushing various advertisements to this passenger. For example, one characteristic of the passenger is that the passenger is interested in a flight for a particular airline. The computing arrangement 50 may use this information to determine that the airline is located in a specific terminal and that advertisements derived from that terminal may be pushed to the passenger. The computing arrangement 50 may then determine that based on the airport operational parameters, e.g., 1 hour delay, that certain advertisements fitting the operating s should be pushed. An example would be that a restaurant offering a 10% discount may want the advertisement pushed to this passenger, but a passenger waiting for a flight that will arrive on-time in 20 minutes, may not be worth pushing an advertisement for a restaurant in the airport.

Two examples of providing information and advertising were provided above. The first was based on no interaction by the passenger and the second was based on the passenger interaction. Thus, there are different types of information which may be provided and varying opportunities for an advertiser to use the kiosk 60 for the purposes of targeted advertising based on different levels of user interaction. In general, the computing arrangement 50 will include inventory management rules for displaying various information based on the various parameters in the system 1. These parameters include the data input or derived from the data feed arrangements 10-40 (the airport operational parameters) and/or the information input by the passenger (the passenger parameters). It should be noted that the inventory management rules may be included with the advertisements as they are input from the data feed arrangement or they may be separately loaded into the computing arrangement 50. The computing arrangement 50 will use the parameters and the inventory management rules to display the appropriate information at the kiosk 60. The computing arrangement 50 allows for the setting and manipulation of the inventory management rules for individual kiosks. Thus, different airport operators may determine that varying inventory management rules or there may even be different inventory management rules for kiosks in the same airport, e.g., based on location.

Those of skill in the art will understand that there are numerous inventory management rules which may be set on computing arrangement 50 to display content to passengers. The description above provided some examples of inventory management rules and the following will provide additional examples of inventory management rules for providing various types of information to the passengers and targeted advertising opportunities for advertisers using the kiosk 60.

The general information screen may provide the status of the departing airport and show general advertising messages from vendors at the departing airport. This is an example of where the information is general information based on the data from the data feed arrangements 10-40 without any user interaction or requests. The inventory management rules for such advertisements are not based on any particular airport operational parameters or passenger parameters, i.e., the advertisers merely pay to have an advertisement (e.g., banner ad) display at regular intervals when there is no interaction by a passenger.

In another general screen, the kiosk 60 may display various travel information/conditions at destination airports. For example, a kiosk at JFK Airport in New York, may cycle through information/condition screens for the airports at Chicago, Atlanta, Los Angeles, etc. The selection of the airports to cycle through may be based on any number of factors such as the number of flights to that destination, a particular airline's choice, etc. Advertisers may intermingle ad content with the information from these destination airports. The advertisers providing this content may be advertisers located at each of the destination airports or cities. For example, the advertiser may say "Here are the local conditions at Atlanta Hartsfield Airport brought to you by Atlanta advertiser X." This example also shows that the computing arrangement 50 may receive data feeds from various locations which are off-site from the airport facility where the kiosk 60 resides. Thus, the computing arrangement 50 may receive data from, for example, the ASD data feed for the offsite airport, OAG, etc., in order to provide information from the offsite airport.

The advertising example described above with reference to the general screen (e.g., 10% off coffee) was an example, where the information was general information and the advertisements were not based on user interaction, but the advertisements were based on particular operating airport operational parameters, e.g., overall on-time performance of the departing airport, airport delays, etc. The data to generate this information may come from, for example, the FAA, the airport operation center, a passive radar system having on-time ranking capability (e.g., PASSUR™) which may combine information from other systems such as OAG, etc. These airport operational parameters combined with the inventory management rules may be used to generate any variety of sponsor messages such as the above described concession discounts, discounts to airline clubs, service advertisements and discounts, etc.

Those inventory management rules may be based, for example, on a particular delay length, on the percentage on-time rankings, etc. For example, computing arrangement 50 may include an algorithm which, when the on-time ranking is greater than a certain percentage, a discount is offered at participating retailers to reward and publicize the outstanding performance of the facility. On the other hand, if the on-time ranking is below a certain percentage, a discount may be provided at participating retailers to take advantage of the delayed captive market. It should be noted that the airport facility and the participating retailers may make financial arrangements to compensate retailers for discounts caused by the airport performance.

The above examples provided examples of information and advertisements based on no passenger interaction. The following examples are those which are based on passenger interaction with the kiosk 60. An example was described above where a passenger enters an arriving flight. In another example, the passenger may enter the flight number of a departing flight. The kiosk 60 may display information for the departing flight, e.g., departing time, gate, etc. The computing arrangement 50 may also identify the destination airport based on the flight number (e.g., derived from the ASD information). This may trigger notifications from the destination airport such as delay notifications from the destination airport, on-time rankings of the destination airport, etc. Other types of information may be weather alerts, the flight tracks of incoming and outgoing aircraft, instant messaging for up to the minute details, etc.

Furthermore, advertising information may also be triggered based on this information which is displayed to the passenger. For example, if the flight is on-time the advertisements may focus on the destination airport, e.g., airport services, hotel offers, rental car offers, etc. In another example, if the flight is delayed, the advertisements may focus on the departing airport, including special offers as described above. Those of skill in the art will understand that there may be any number of algorithms that may be contained within the computing arrangement 50 to determine the correct advertisements to push. For example, the flight entered by the passenger may be on-time, but it may not be leaving for three (3) hours. Thus, the algorithm may still push departing airport offers because the passenger will be a captive audience in the terminal for several more hours.

In another example, the passenger may interact in a different manner with the kiosk 60. For example, the passenger may enter a frequent flyer number or a credit card number to trigger more targeted advertising. For example, the passenger may be a frequent flyer and have access to special offers for only frequent flyers. The computing arrangement 50 may store information on the passenger allowing the passenger to have access to these offers. Also, the computing arrangement may store additional data based on, for example, past buying habits to generate even more targeted advertising. Thus, a passenger profile may be built up over time which allows for advertisers to target the passenger based on the passenger's personal preferences.

The information available at the kiosk 60 may also be obtained in other manners. For example, the computing arrangement 50 may use the communication network 70 to make the displays available at a remote location, e.g., a passenger's home via the Internet. In such an example, the computing arrangement may push information and/or advertisements based on the location at which the passenger is viewing the screens. An example of information provided to a remote passenger may be the airport's general condition, the average wait at the security gate, arrival and departure rates, roadway delays, etc. The advertising may also be targeted to such a remote passenger by including offers and discounts on airport concessions that the passenger may otherwise purchase off of the airport site.

There may be various advertising revenue streams which could be generated by the operator of the kiosk 60. For example, advertisers which have rotating banners on the general screen may pay a particular advertising rate. Those advertisers which desire to target specific passengers based on the passenger information and the airport status may pay a different advertising rate. Those advertisers who wish to be participating retailers for offering discounts based on the airport performance may pay an even different advertising rate. In fact, because the advertiser is basing the discount on airport performance, over which they have no control, the airport may offer this advertising for free in order to make the overall travel experience more comfortable for the passengers.

Figure 3:
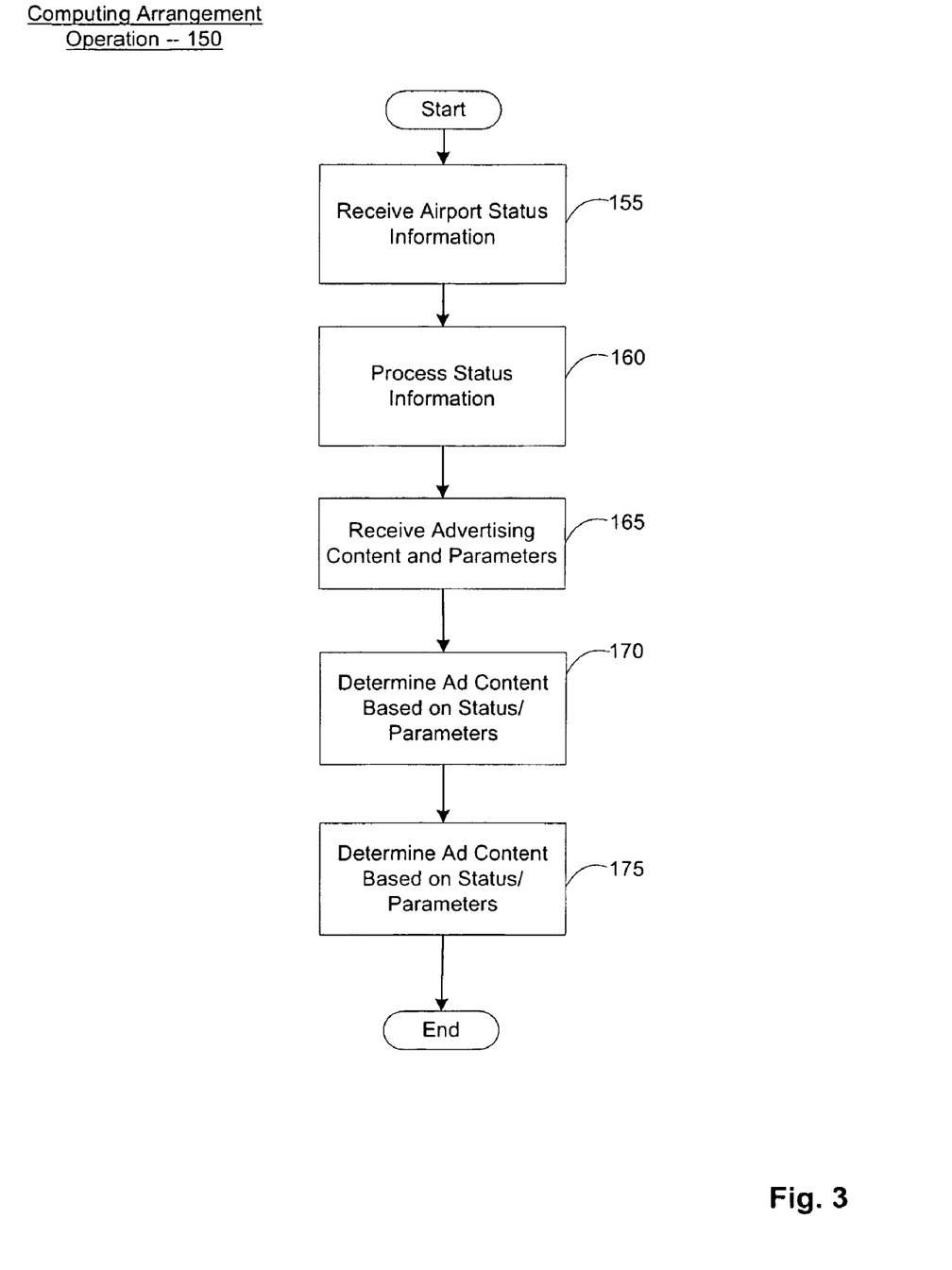
FIG. 3 shows an exemplary process for operation of the computing arrangement according to the present invention.

FIG. 3 shows an exemplary process 150 for operation of the computing arrangement 50. In step 155, the computing arrangement receives the data from the data feed arrangements 10-40 which includes the status information for the airport. Exemplary status data has been previously described above. In step 160, the computing arrangement 50 processes the status data. This processing includes aggregating the data from the different data feed arrangements 10-40, deriving additional information from the data and formatting the data so it can be displayed to a passenger.

In step 165, the computing arrangement receives the ad content and the inventory management rules which govern the delivery of the ad content. Once again, exemplary ad content and inventory management rules have been described previously. The process 150 then continues to step 170 where the computing arrangement uses the processed status information and the inventory management rules to determine the ad content that should be displayed by the kiosk 60. This determination may take into account the airport operational parameters, the amount and level of the passenger interaction (the passenger parameters) and the inventory management rules. After this determination has been made, the computing arrangement displays the various status information for the airport facility and the ad content corresponding to the various parameters and rules. (step 175).

Figure 4:
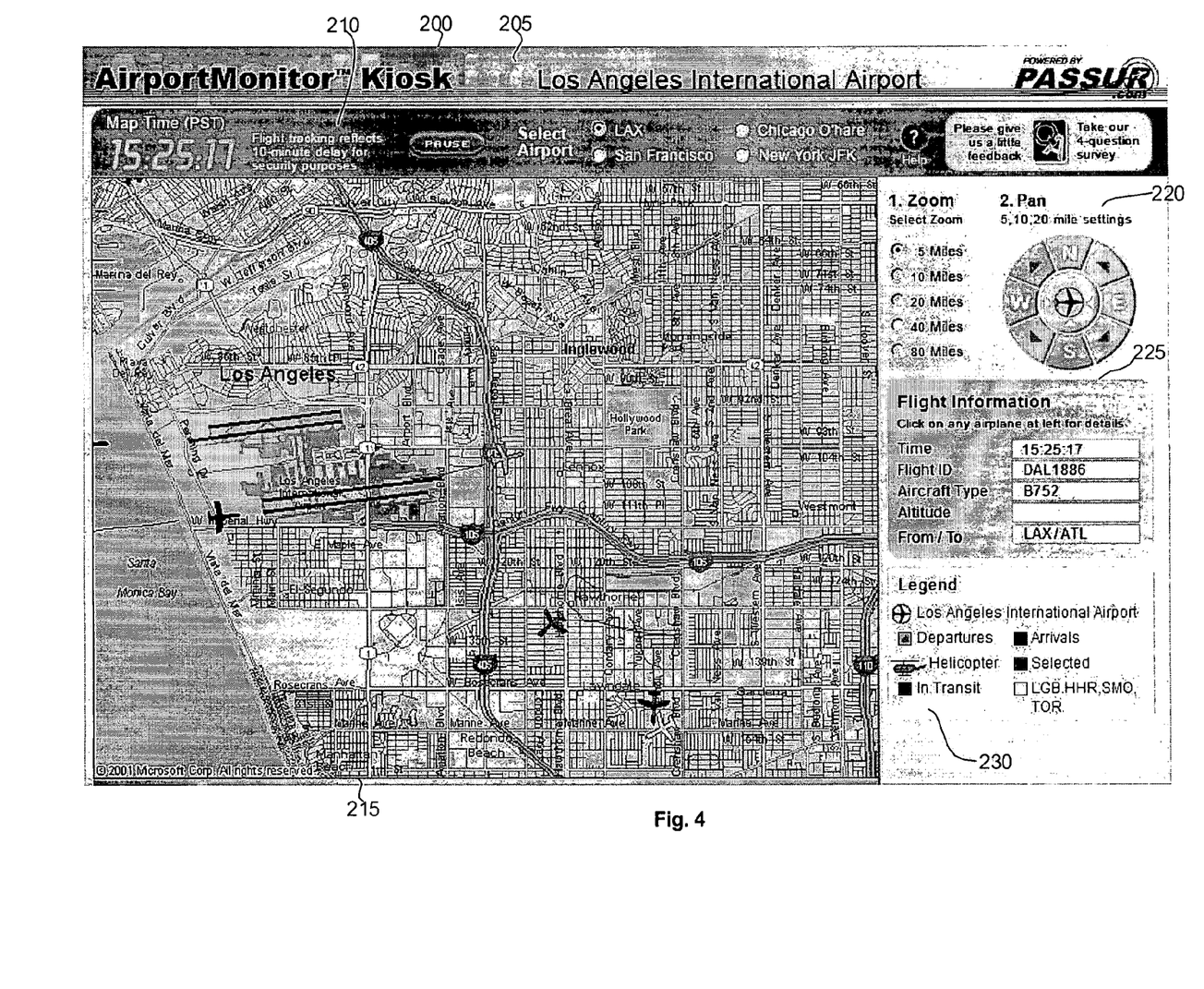
FIG. 4 shows an exemplary general display screen which may be displayed by the kiosk according to the present invention.

The following provide exemplary display screens which may be displayed by a display 65 of the passenger kiosk 60. Each of the exemplary displays described below may include information that is pre-programmed on the display and information contained in or derived from data input arrangements 10-40. FIG. 4 shows an exemplary general display screen 200 which may be displayed by the kiosk 60. The general display screen 200 may be the default screen for the kiosk 60 which is displayed when there is no passenger interaction with the kiosk 60. Thus, the general display screen 200 may be a unique screen that attracts passengers to the kiosk 60. The general display screen 200 includes a header area 205, a general information area 210, a flight track area 215, a screen manipulation area 220, a flight information area 225 and a legend area 230. The header area 205 may includes information about the general display screen 200 such as the provider of the screen/service and the airport to which the general display screen 200 relates (e.g., Los Angeles International Airport ("LAX")).

The general information area 210 may include the time for which the map is being displayed (e.g., 15:25:17 pst) and may also provide a passenger with the ability to pause the map at the current time or get general help on the system. The general information area 210 may also provide the passenger with the ability to select a different airport to be displayed (e.g., San Francisco, Chicago O'Hare and New York JFK). As described above, the airport operator may choose to cycle the general display screen 200 to each of these various airports or may leave the general display screen 200 specific to the current airport.

The flight track area 215 shows a map of the terminal area and shows flight tracks of various aircraft within the terminal area. The flight tracks are generally shown as aircraft icons with tails that show the current location of the aircraft, the direction the aircraft is traveling and the tails showing the flight path of the aircraft. Those who are interested in a more complete description of flight tracks are directed to U.S. patent application Ser. No. 10/408,298 entitled "Simplified Flight Track Display System" which is assigned to Megadata Corporation, and is incorporated, in its entirety, by reference herein.

The screen manipulation area 220 allows passengers to manipulate the view shown by the flight track area 215 by, for example, changing the terminal area zoom radius and by panning the terminal area. The flight information area 225 allows the user to select one of the aircraft icons on the flight track area 215 and display additional information about the flight, e.g., the time for the location, the flight ID, the aircraft type, the altitude, and the origination and destination of the flight. Those of skill in the art will understand that some of the information may be displayed on a delayed basis for security purposes.

Finally, the legend area 230 provides the passenger with information about the flight track area 215. The general display screen 200 of FIG. 2 is shown in grey scale and therefore, the legend area 230 is does not provide the information as may be displayed on a color display screen. However, in general, the aircraft icons in the flight track area 215 may be color coded to show, for example, that the aircraft is a departure from LAX, scheduled to arrive at LAX, in transit though the terminal airspace, an arrival/departure from a nearby airport, that it is the icon selected by the passenger for which to display further information in flight information area 225, etc. The legend area 230 may also provide an indication showing the location of the airport and the type of aircraft associated with different icons.

As described above, the general display screen 200 may be the default screen which is displayed when there is no passenger interaction. The general display screen 200 is meant to grab the attention of passengers so that they begin to interact with the kiosk 60. Those of skill in the art will understand that the general display screen 200 is only exemplary and that other general display screens may be used to attract passengers to the kiosk 60.

Figure 5:
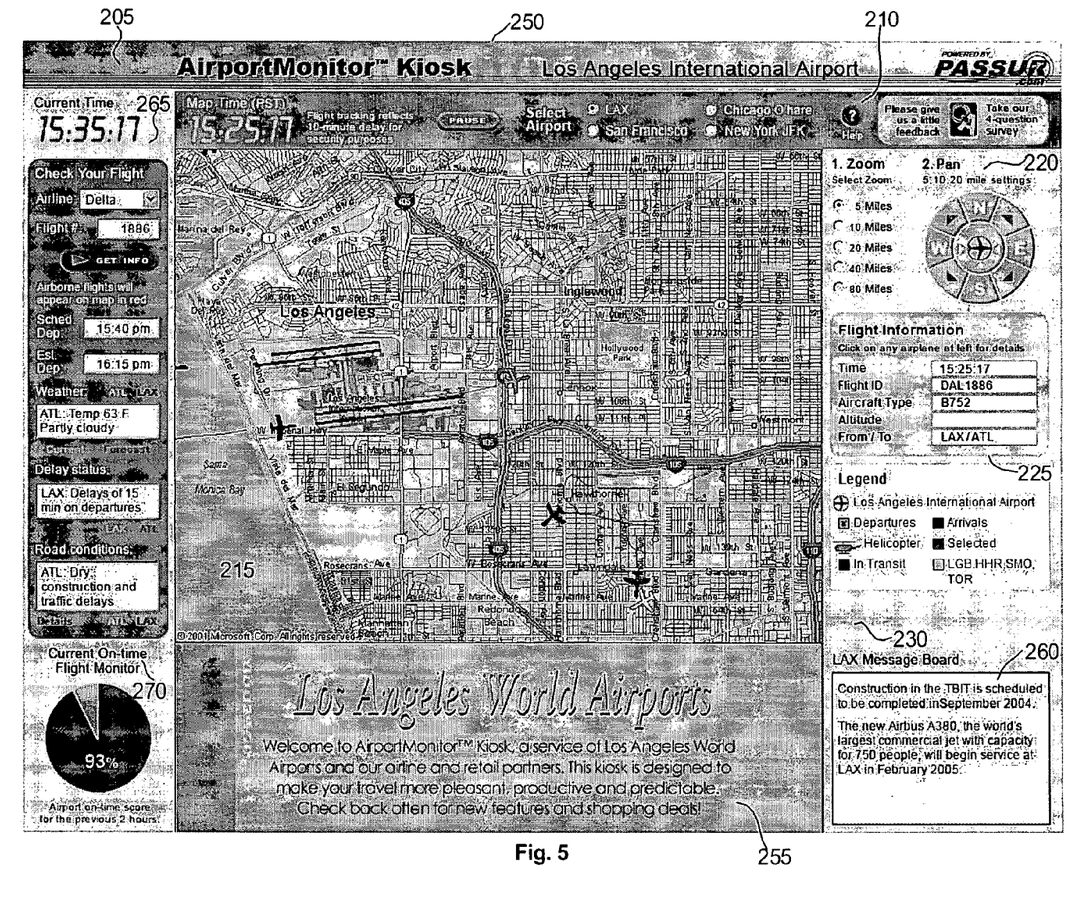
FIG. 5 shows a second exemplary general display screen which may be displayed by the kiosk according to the present invention.

FIG. 5 shows an exemplary general display screen 250 which may be displayed by the kiosk 60. This exemplary general display screen includes the header area 205, the general information area 210, the flight track area 215, the screen manipulation area 220, the flight information area 225 and the legend area 230 described above for general display screen 200. Thus, these areas will not be described for a second time. The general display screen 250 further includes an advertisement area 255, a message board area 260, a find flight area 265 and a airport status area 270.

The advertising area 255 is an area on the general display screen 250 which may include advertisements. In this example, the advertisement is a general advertisement from the airport authority. The message board area 260 allows the airport operator to post messages which are displayed to the passengers. The message board area 260 may be remotely updated through the data feed arrangements 10-40 or from the communication network 70.

The find flight area 265 allows passengers to check for information on specific flights scheduled for arrival or departure from the airport. For example, a user may use the input device(s) 67 to choose a particular airline from a drop down menu, enter the flight number of interest and select the "Get Info" button. The computing arrangement 50 may then return specific information on the flight (e.g., scheduled departure/arrival time, estimated time of departure/arrival, weather at departing/arriving airport, departing/arriving airport status, etc. Again, the information displayed on general display screen 250 is only exemplary and the airport operator may select to display various information based on the passenger request.

The airport status area 270 may display general information on the airport status. In this example, the display includes the airport on-time score for the previous two hours. As described above, this airport status may be used as a parameter in various inventory management rules to drive advertising to the passengers.

Figure 6:
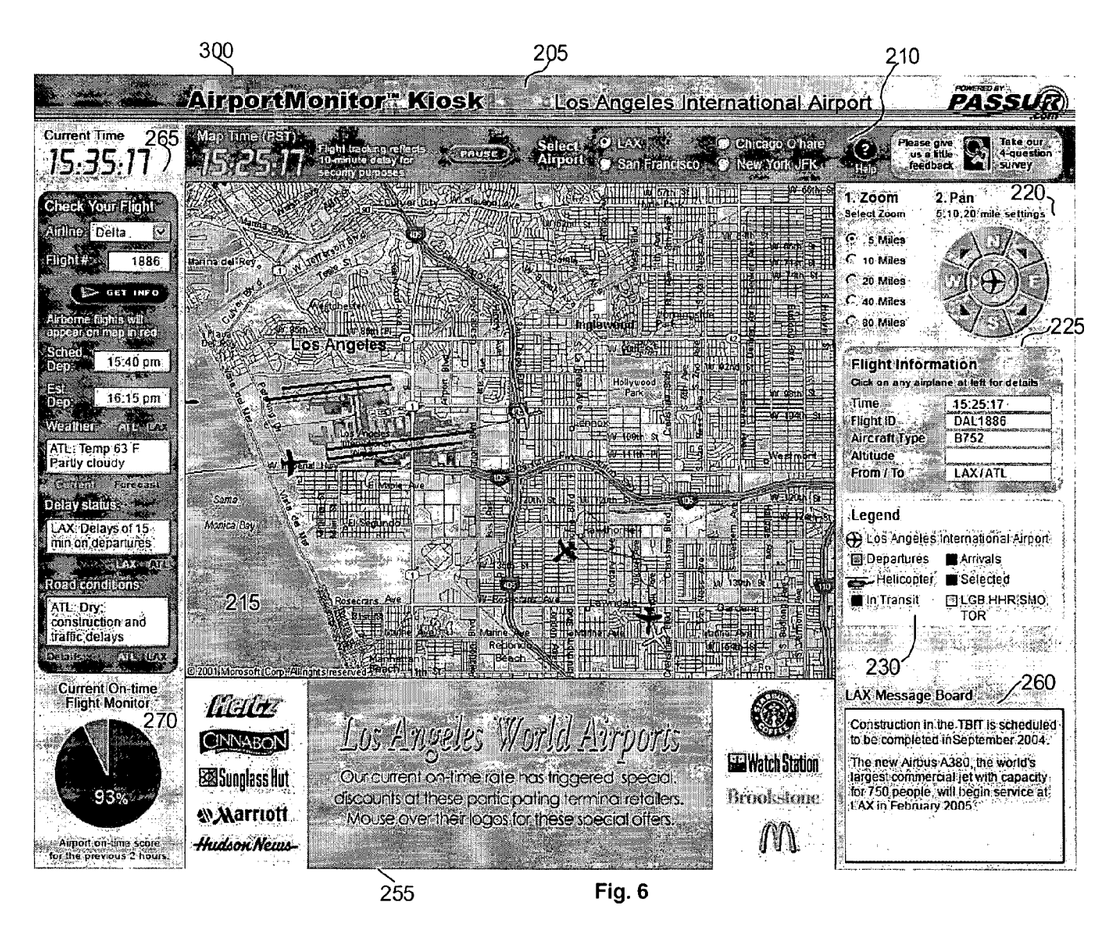
FIG. 6 shows a first exemplary advertising display screen which may be displayed by the kiosk according to the present invention.

FIG. 6 shows a first exemplary advertising display screen 300 which may be displayed by the kiosk 60. This first exemplary advertising display screen 300 includes the header area 205, the general information area 210, the flight track area 215, the screen manipulation area 220, the flight information area 225, the legend area 230, the advertisement area 255, the message board area 260, the find flight area 265 and the airport status area 270 described above. However, in this example, the advertising area 255 includes additional advertisements which are displayed to the passengers.

As shown in this example, the advertisements may be logos of the shops located in a particular airport terminal. Again, as described above, this particular advertiser content may be general as the top level advertisement pushed to the passenger or it may be based on particular parameters input into the inventory management rules. For example, the top level inventory management rule may be that these advertisers have paid to have their ads shown each time a new passenger first interacts with the kiosk 60. Thus, when a general display screen is shown (e.g., general display screen 200 or 250) and a passenger uses any one of the input device(s) 67 to interact with the kiosk 60, the banner ads shown may be the first ads to pop into advertising area 255. In another example, these ads may be driven based on the passenger parameters as entered by the passenger. An example of this may be that since the passenger entered "Delta Airlines," these ads were pushed to the passenger because these shops are in the Delta terminal. As described above, there may be any number of inventory management rules stored in the computing arrangement 50 for pushing advertising to the passengers.

FIG. 7 shows a second exemplary advertising display screen 350 which may be displayed by the kiosk 60. The advertising display screen 350 includes the same areas as described above. However, in this example, the passenger used an input device 67 to place an icon over one of the advertiser's logos. In this example, the logo is the McDonalds logo. The placing of the icon over the logo generates a larger advertisement in the center section of the advertising area showing a special offer by the retailer. As described above, the special offer may be based on inventory management rules which factor airport operational parameters into the offers of the participating retailers. For example, the airport operational parameter for the inventory management rule may be the current on-time performance of the airport as shown in airport status area 270. The exemplary rule may be that if the on-time performance is greater than 90%, this particular offer should be displayed to passengers.

Figure 8:
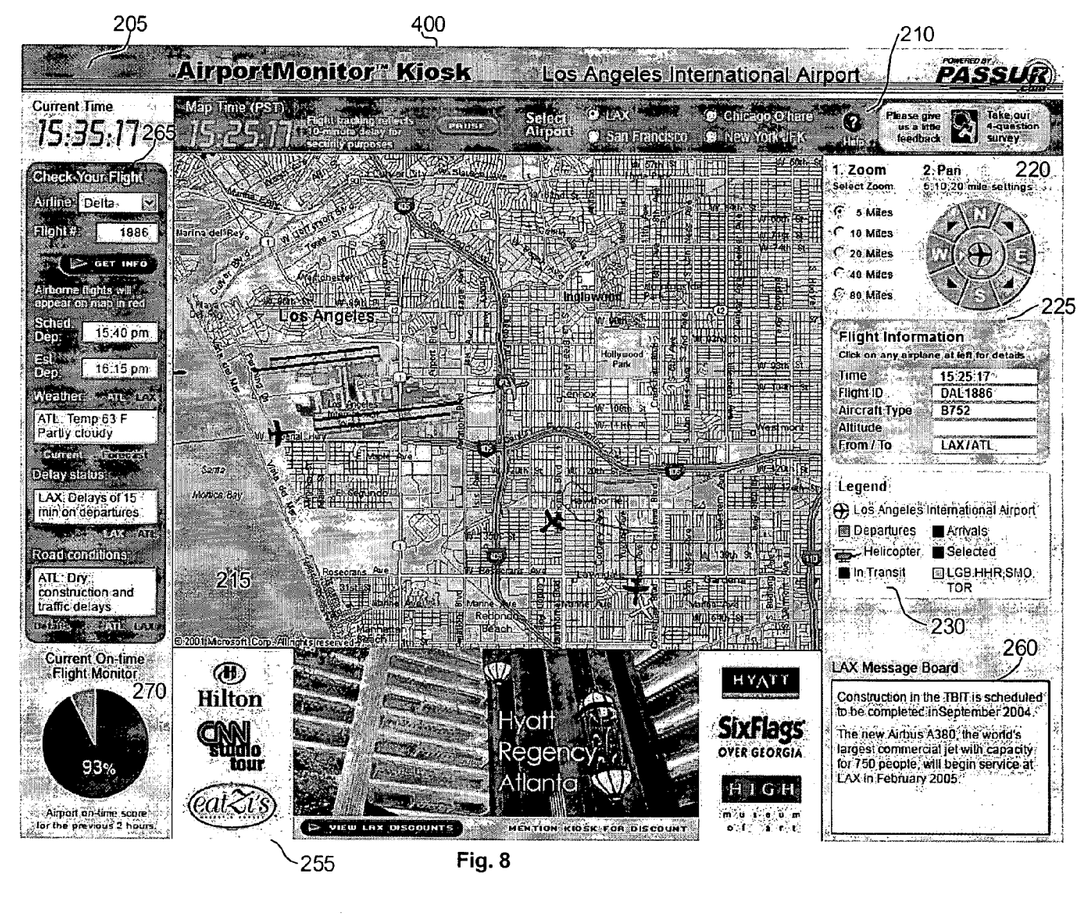
FIG. 8 shows a third exemplary advertising display screen which may be displayed by the kiosk according to the present invention.

FIG. 8 shows a third exemplary advertising display screen 400 which may be displayed by the kiosk 60. The advertising display screen 400 includes the same areas as described above. In this example, the advertising area 255 shows advertisements from the destination city based on the passenger input into the find flight area 265. As described above, the passenger may select to receive information on a particular flight, which in this example is a flight to Atlanta. The computing arrangement 50 may have an inventory management rule that provides for the pushing of advertising based on flight destinations. Thus, when computing arrangement 50 determines that the passenger is interested in the destination of Atlanta, the advertising display screen 400 may show advertising related to the destination of Atlanta, e.g., hotels, restaurants, attractions, etc.

The middle of the advertising field 255 may be activated based on the passenger's selection of one of the banner ads (e.g., the Hyatt ad) or the advertiser may pay for direct placement in the center section. As shown in this example, these off-site advertisers may also have specific offers or discounts that can be accessed by, for example, mentioning where the passenger saw the ad, printing a coupon, etc. Thus, the advertiser may determine how successful the ad placement is by the number of offers that are redeemed. This may apply equally to on-site (e.g., airport retailers) and off-site advertisers.

The offers at the destination airport may also be based on airport operational parameters either of the departing airport or the destination airport. Where offers are based on the destination airport, the departing airport kiosk 60 may need a data input arrangement with the airport operational parameters of the destination airport in order to use these parameters in implementing the inventory management rules.

Figure 9:
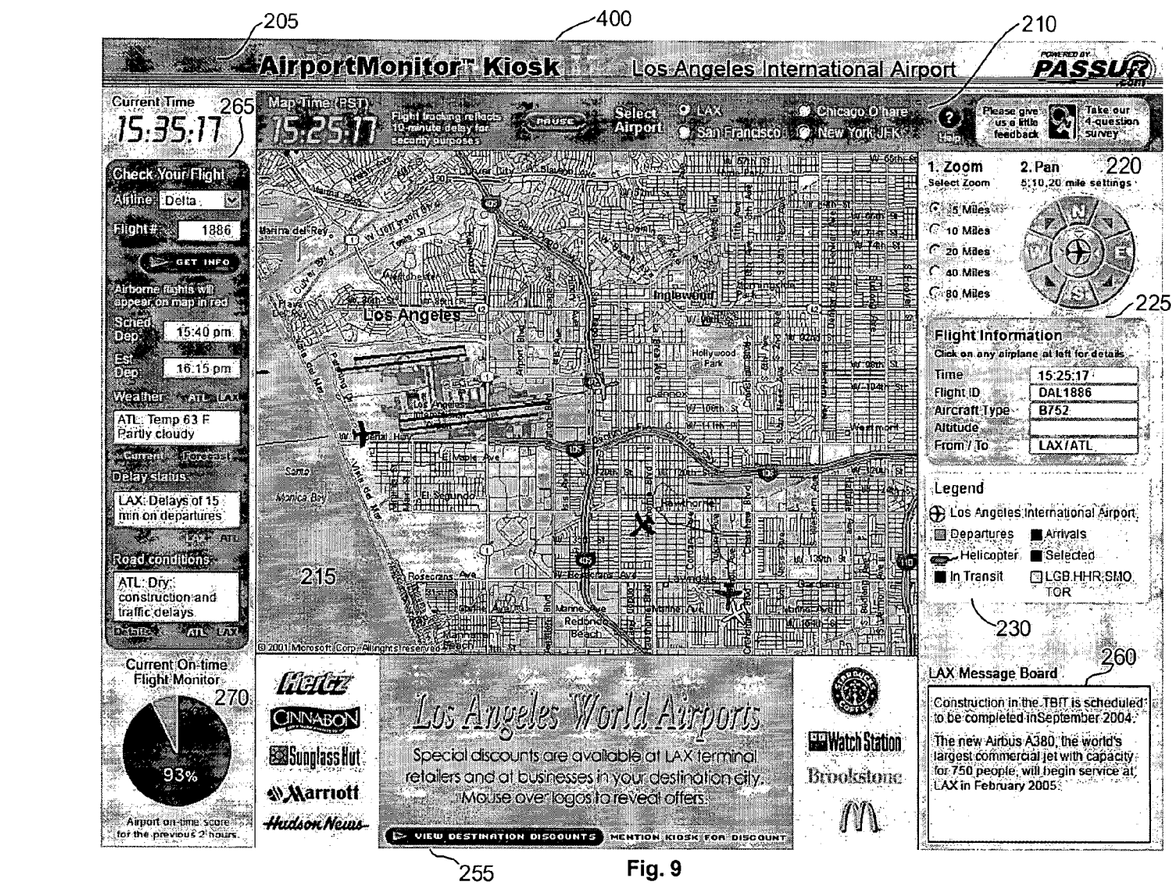
FIG. 9 shows a fourth exemplary advertising display screen which may be displayed by the kiosk according to the present invention.

The advertising area 255 may also include a button for the passenger to toggle between offers at the destination airport and the departing airport. FIG. 9 shows a fourth exemplary advertising display screen 450 which may be displayed by the kiosk 60. This advertising display screen shows that a passenger has toggled from the destination airport advertising (e.g., Atlanta) to the departure airport advertising (e.g., LAX) as shown in advertising area 255. As described above, the screens 200, 250, 300, 350, 400 and 450 are only exemplary and there may be any number of other manners in which to visually display the airport operational parameters and the advertising content to the passengers.

It should also be understood that the exemplary kiosk 60 of the present invention may be placed at locations other than the airport for use by airline passengers. Examples of non-airport locations include hotels, convention centers, airline clubs, etc.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

The invention claimed is:

1. A passenger kiosk, comprising:
a computing arrangement receiving data from a plurality of data feed arrangements, the data including airport operational parameters for an airport facility, a set of advertisements and inventory management rules;
a kiosk display displaying one of the advertisements based on one of the airport operational parameters and one of the inventory management rules; and
a kiosk input device receiving input from a passenger and providing the input to the computing arrangement, the input including a passenger parameter, the kiosk display displaying a second one of the advertisements based on the passenger parameter and a second one of the inventory management rules,
the computing arrangement notifying retailers of offers currently being presented to the passenger in the displayed advertisements, the kiosk display displaying a first advertisement from a retailer located at a departing airport in response to the passenger parameter fulfilling a first condition, and displaying a second advertisement from a retailer located at an arriving airport in response to the passenger parameter fulfilling a second condition.

2. The passenger kiosk of claim 1, wherein the kiosk display displays a third one of the advertisements based on the passenger parameter, the one of the airport operational parameters and a third one of the inventory management rules.

3. The passenger kiosk of claim 1, wherein the computing arrangement includes a processor for processing the airport operational parameters and a memory for storing the airport operational parameters, the set of advertisements and the inventory management rules.

4. The passenger kiosk of claim 1, further comprising:
a printer for printing the advertisements.

5. The passenger kiosk of claim 1, wherein the set of advertisements arc for retailers located within the airport facility.

6. The passenger kiosk of claim 1, wherein the airport operational parameter is an on-time parameter for the airport facility.

7. A computer readable storage medium including a set of instructions executable by a processor, the set of instructions being operable:
receive data from a plurality of data feed arrangements, the data including airport operational parameters for an airport facility, a set of advertisements and inventory management rules;
display one of the advertisements based on one of the airport operational parameters and one of the inventory management rules;
receive input from an input device, the input including a passenger parameter;
display a second one of the advertisements based on the passenger parameter and a second one of the inventory management rules; and
notify retailers of offers currently being presented to the passenger in the displayed advertisements, wherein the displaying of the one of the advertisements includes displaying a first advertisement from a retailer located at a departing airport in response to the passenger parameter fulfilling a first condition, and the displaying of the second one of the advertisements includes displaying a second advertisement from a retailer located at an arriving airport in response to the passenger parameter fulfilling a second condition.

8. The computer readable storage medium of claim 7, wherein the instructions are further operable to: display a third one of the advertisements based on the passenger parameter, the one of the airport operational parameters and a third one of the inventory management rules.

9. The computer readable storage medium of claim 7, wherein when the passenger parameter is a destination airport, the second one of the advertisements is related to the destination airport.

10. The computer readable storage medium of claim 7, wherein the data feed arrangements include one of an active radar data feed and a passive radar data feed.

11. The computer readable storage medium of claim 7, wherein the instructions are further operable to: print the displayed advertisement.

12. The passenger kiosk of claim 1, wherein the kiosk display displays the second advertisement further based on a level of interaction of the passenger with the kiosk input device.

13. The computer readable storage medium of claim 7, wherein the displaying of the second advertisement is further based on a level of interaction of the passenger with the input device.

14. The passenger kiosk of claim 1, wherein the airport operational parameters comprise weather data and roadway data.

15. The computer readable storage medium of claim 7, wherein the airport operational parameters comprise weather data and roadway data.

16. A computer readable storage medium including a set of instructions executable by a processor, the set of instructions being operable to:
receive data from a plurality of data feed arrangements, the data including airport operational parameters for an airport facility, a set of advertisements and inventory management rules;

display one of the advertisements based on one of the airport operational parameters and one of the inventory management rules;

receive input from an input device, the input including a passenger parameter;

display a second one of the advertisements based on the passenger parameter, passenger location and a second one of the inventory management rules, wherein the displaying of the one of the advertisements includes displaying a first advertisement from a retailer located at a departing airport in response to the passenger parameter fulfilling a first condition, and the displaying of the second one of the advertisements includes displaying a second advertisement from a retailer located at an arriving airport in response to the passenger parameter fulfilling a second condition.

17. The passenger kiosk of claim 1, wherein the first condition corresponds to a delayed flight, and the second condition corresponds to an on-time flight.

18. The computer readable storage medium of claim 7, wherein the first condition corresponds to a delayed flight, and the second condition corresponds to an on-time flight.

19. The computer readable storage medium of claim 16, wherein the first condition corresponds to a delayed flight, and the second condition corresponds to an on-time flight.

* * * * *